Figure 1:
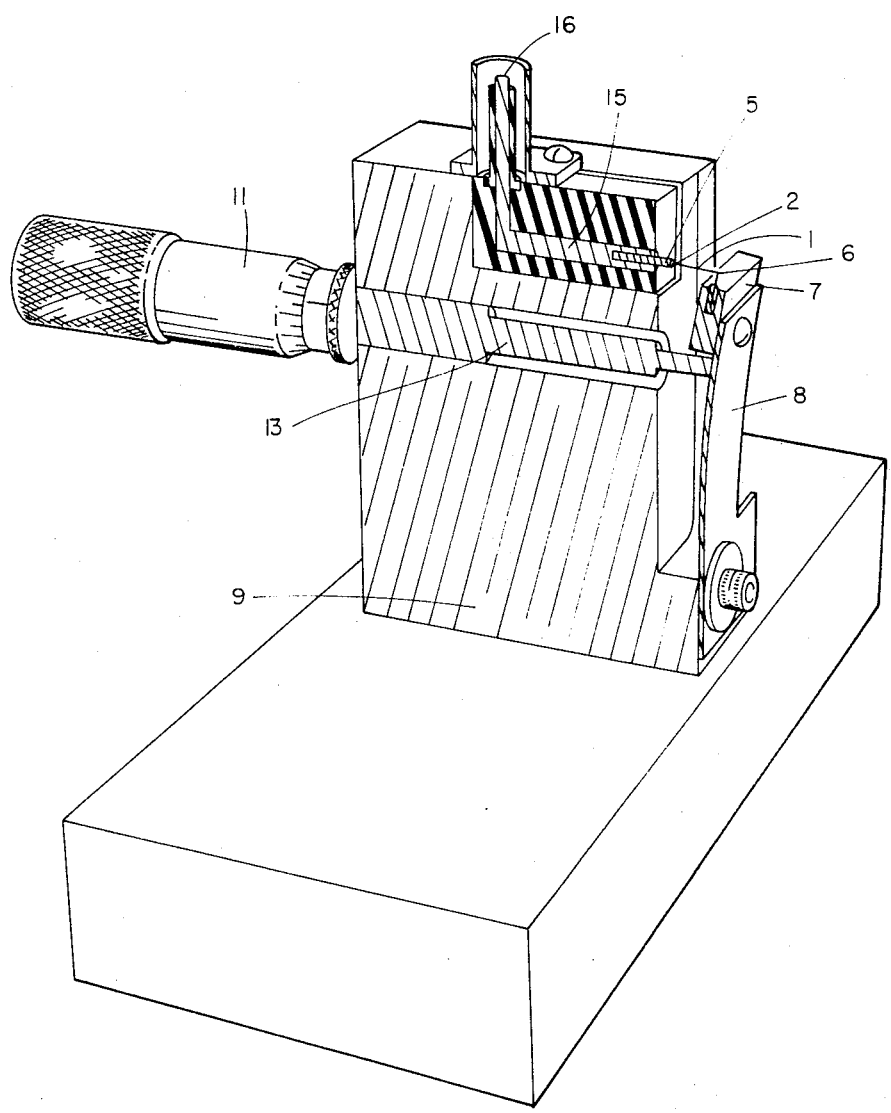

United States Patent [19]
Javan

[11] 3,755,678
[45] Aug. 28, 1973

[54] APPARATUS AND PROCESSES FOR DETECTION, GENERATION AND FREQUENCY MEASUREMENTS OF ELECTRO-MAGNETIC RADIATION IN THE INFRARED AND VISIBLE DOMAIN

[75] Inventor: Ali Javan, Boston, Mass.
[73] Assignee: Massachusetts Institute of Technology, Cambridge, Mass.
[22] Filed: Aug. 10, 1970
[21] Appl. No.: 62,380

[52] U.S. Cl............ 250/211 J, 324/79, 317/235 N, 250/83.3 H, 250/220 R
[51] Int. Cl. ......................................... H01l 15/00
[58] Field of Search................. 250/211, 211 J, 212, 250/83.3 H, 220 R; 317/235 N, 234 P; 324/79

[56] References Cited
UNITED STATES PATENTS
3,111,587  11/1963  Rocard .......................... 250/211 X
3,233,111  2/1966  Pike .............................. 250/211 J.

OTHER PUBLICATIONS
Dees: Detection & Harmonic Generation in the Submillimeter Wavelength Region; Microwave Journal; Vol. 9; Sept., 1966; pp. 48–55.
Hocker et al.: Frequency Mixing in Infrared & Far Infrared Using Metal to Metal Point Contact Diode; Applied Physics Letters; Vol. 12; No. 12; June 15, 1968; pp. 401, 402.

Primary Examiner—Walter Stolwein
Attorney—Thomas Cooch, Martin M. Santa and Robert Shaw

[57] ABSTRACT

A metal to metal point contact diode with an extremely fast response comprising a metal base and an extremely thin metal wire, a cat whisker, with an end point about the order of a thousand angstroms (0.1 micron) or less in diameter at its junction with the diode's base. Detection of low power radiation is accomplished by detecting a voltage across the diode when incident radiation impinges on the cat whisker. Alternatively, the weak signal to be detected is coupled to the diode, together with a strong laser radiation at a frequency in the vicinity of the weak signal to be detected, thereby developing an alternating voltage signal at the difference frequency of the laser and the weak signal. This superheterodyne process is capable of detecting infrared signals below $10^{-15}$ watts. Frequency measuring is accomplished by hesterodyning an induced current in the whisker with the unknown frequency with a harmonic of a known lower frequency and a known microwave difference frequency to produce a strong beat note. The unknown frequency to be measured can be determined from the known lower frequency and the known microwave difference frequency. Generating radiation in the infrared and visible region is accomplished by subjecting the diode to an incident laser radiation. The cat whisker emits radiation at integral multiples of the laser frequency.

16 Claims, 2 Drawing Figures

PATENTED AUG 28 1973 3,755,678

SHEET 1 OF 2

INVENTOR:
ALI JAVAN

APPARATUS AND PROCESSES FOR DETECTION, GENERATION AND FREQUENCY MEASUREMENTS OF ELECTRO-MAGNETIC RADIATION IN THE INFRARED AND VISIBLE DOMAIN

FIELD OF THE INVENTION

This invention relates to detecting, frequency measuring and generating electromagnetic radiation in the infrared and visible region.

PRIOR ART

Infrared radiation may be detected and its frequency can be measured by the use of thermocouples, photoconductors, photodiodes, photovoltaics or similar detectors. For instance, in the thermocouple a D-C current results from the heating of the junction between two metals due to the incident radiation. The thermocouple can be operated at room temperature and is sufficiently sensitive to detect $10^{-12}$ watts with a minimum bandwidth of 1 cycle per second. However, the response time of the detector is extremely slow. If the radiation to be detected is modulated above $10^2$ cycles per second, the thermocouple begins to lose its sensitivity to detect the modulated radiation and above $10^6$ cycles per second it is ineffective. The response time is particularly important in frequency measurements. Indeed, if the speed of response of a detector in the ideal case is as fast as the frequency of the incident radiation, the detector can be used for harmonic frequency mixing by which the unknown frequency of the incident radiation can be easily determined.

In the photoconductor, a current is produced by the generation of carrier electrons arising from the absorption of the incident radiation. Typically, the photoconductor is sensitive to $10^{-12}$ watts and has a speed of response of about $10^{10}$ cps. One important limitation, however, is that it must be operated at liquid nitrogen temperatures. The same is true of the photovoltaic detector and the photodiode. There are some photodiodes which will operate at room temperature as well as at liquid nitrogen temperatures, but the upper limit of their response time is $10^{10}$ cps. Additionally, a point contact metal silicon diode, with 1 mill cat whisker as described in the Microwave Journal, Sept. 1966, pp 48–55, by J. W. Dees, has been used as a detector with response times in the microwave region. However, recently, the use of this type metal silicon diode has been extended to detect radiation in the far infrared region. The above devices because of their limits of speeds or response, cannot be utilized as detectors to determine unknown frequencies in the infrared and visible domain of $10^{13} - 10^{14}$ cps. The bare possibility that a metal-metal diode might be a "candidate for possible use in the infrared laser harmonic frequency mixing" was suggested by Javan et al., in Applied Physics Letters, Vol. 12 No. 12, 15 June 1968.

Alternately, frequency can be determined from the known value of the speed of light and a measurement of wavelength. There are several standard devices for measuring wavelength, such as the spectrograph or interferometer, but the accuracy of such measurements is limited at the best to within one part in $10^8$ in the visible range and about one part in $10^5$ in the infrared range. Furthermore, the known accuracy of the speed of light is only one part in $10^6$. As a result, these considerations limit such a measurement of frequency to within about one part in $10^5$ to one part in $10^6$.

With respect to generating coherent infrared radiation, the only known means today are the laser, and bulk non-linear elements.

SUMMARY OF THE INVENTION

In view of the aforementioned limitations in ascertaining the frequency of radiation in the infrared and visible region, it is applicant's primary object to provide an apparatus and method for directly determining the frequency of radiation in the infrared and visible region with a high degree of accuracy.

It is another object of the invention to provide an apparatus and method for detecting radiation of extremely low power in the infrared and visible region.

It is a further object of the invention to provide an apparatus and method for generating radiation in the infrared and visible region with a known frequency.

These and other objects are obtained by utilizing a metal point contact diode with a speed of response faster than the frequency to be measured comprising a metal base and an extremely thin wire, a cat whisker, with an end point about the order of a thousand angstroms (0.1 micron) or less in diameter at its junction with the metal base. Detection of low power infrared and visible radiation is accomplished by detecting a voltage across the diode when incident radiation impinges on the cat whisker. Alternatively, the weak signal to be detected is coupled to the diode together with a strong laser at a frequency in the vicinity of the weak signal to be detected, thereby generating an alternating voltage signal at the difference frequency of the laser and the weak signal. Frequency measuring is accomplished by mixing in the diode the radiation whose frequency is to be determined with radiation from a microwave source with a variable frequency. A beat note is observed when the microwave source is tuned to a frequency equal to or close to the difference frequency between the fundamental of the unknown frequency and a harmonic of the known lower frequency. Since the frequency of the harmonic and the microwave source when tuned to produce a beat note are known, the unknown frequency can be easily determined. Generating infrared and visible radiation is accomplished by subjecting the diode to infrared laser radiation at a frequency. The diode in turn will emit radiation with frequencies that are integral multiples of the laser radiation. Here again, a microwave frequency may also be coupled, and the resulting emitted radiation will have frequencies reflecting the sum and difference and their respective various harmonics.

Further objects and a better understanding of the apparatus and process will become more apparent with the following description taken in conjunction with the accompanying drawings.

FIG. 1 — Perspective Cross Sectional View of metal to metal point contact diode.

Figure 2:
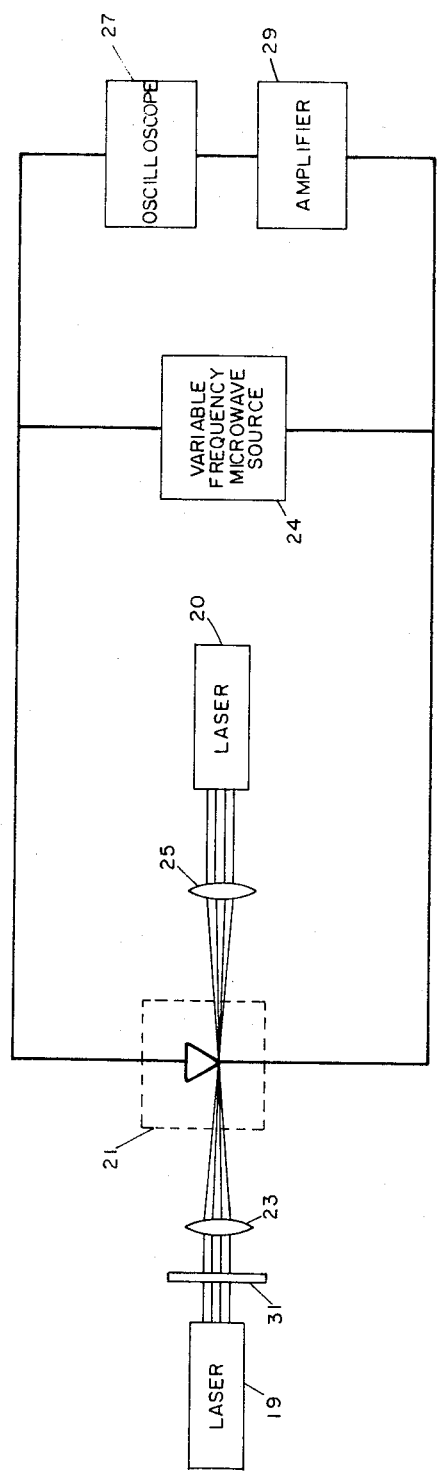

FIG. 2 — Schematic set up for frequency measurement.

PREFERRED EMBODIMENT

The metal to metal point contact diode used for measuring the unknown frequency of electromagnetic radiation is illustrated in FIG. 1. The diode consists of a thin tungsten wire antenna 1, a "cat whisker", and a nickel base 5. The whisker 1 is approximately 2 microns in diameter, several millimeters in length, and has tip 2 whose point has a diameter about a thousand angstroms or less and makes contact with nickel base 5 to provide the diode junction. The base 5 is held in place by a brass post 15 which in turn is connected directly to the center contact of a coaxial connector 16.

The whisker is held in place by a "whisker holder" 7 to which it is soldered by standard techniques. In general, the whisker is not wetted, but is held by solder which squeezes it. The whisker holder, in turn, is mounted to a flexible phosphor bronze strip 8 which is attached to the bottom of the main frame 9.

A micrometer 11, whose shaft 13 rests against the bronze strip 8, is attached and fixed with reference to frame 9. By adjusting the micrometer 11, the displacement of the phosphor bronze strip from frame 9 is controlled, whereby the displacement and contact pressure of the cat whisker 1 relative to the metal base 5 is controlled. A 90° bend 6 is placed in the cat whisker 1 so that the whisker holder acts as a pivot point thereby providing a fine tuning effect with reference to adjusting the contact pressure between the whisker 1 and metal base 5.

The construction of the whisker is accomplished by starting with a large diameter wire and etching it down to a smaller diameter over as much of the length as is desired. In this process, a KOH solution of about 0.1 normal is used and a 6 volt AC source is applied across the wire. The resulting current through the wire etches it to a smaller diameter over the length that is submerged in the KOH solution. The point 2 of the whisker is made by etching just the end of the whisker in the solution, by either etching it away completely or by rapidly etching for a short time. The resulting point has a diameter of about a thousand angstroms or less.

FIG. 2 depicts a diagrammatic view of apparatus utilizing the diode-detector for measuring an unknown frequency. The output from a source 19, e.g. a $CO_2$ laser operating at a nominal 9.3 $\mu$ wavelength is focused by means of a lens 23 on the thin wire antenna 1 near the region of its junction with nickel base 5. The diode is represented symbolically as an element 21 in FIG. 2. The position of the lens is adjusted such that the output from the laser source has a spot diameter of 0.2 - 0.3 mm at its intersection with the cat whisker 1. A second source 20 with a known lower frequency is similarly coupled to the cat whisker. In FIG. 2 the second source 20 is a $H_2O$ laser operating with an output at a nominal 28 $\mu$ wavelength.

A third source 24, a microwave source, is coupled to the cat whisker by means of a cable to the coaxial connector 16. The output frequency of the microwave source is variable and known.

The lasers 19, 20 may be operated in the pulsed mode or continuously. In the pulsed mode, the $CO_2$ laser is Q-switched by a rotating mirror. Voltage pulses can be obtained from the rotating mirror using a light beam detected by a photocell. These pulses in turn can be used for triggering the $H_2O$ laser and the microwave source, e.g. a klystron. For pulsed lasers, typically, the output of the $CO_2$ laser is 100 watts over one half a micro-second pulse width, the $H_2O$ laser, 10 watts over 3 microseconds pulse width, and the microwave source, a klystron, 30 milliwatts.

If the lasers and the klystron are operated continuously their output is kept below about 100 milliwatts to prevent diode burnout. A chopper 31 is usually inserted between the $CO_2$ laser and the diode for determining synchronously when the electromagnetic radiation is incident on the whisker. The importance of this will be made apparent later.

Initially, micrometer 11 is adjusted such that the tip 2 of the cat whisker 1 just makes contact with the nickel base 5. Here, the cat whisker 1 acts as a wire antenna to which the incident infrared radiation is coupled much the same as the antenna coupling for microwave or radio waves. If the micrometer is adjusted properly, a DC voltage is found to develop across the point contact element. This voltage does not arise from the thermoelectric effect, but from induced alternating currents with frequencies of the incident radiations which are rectified by the detector. The detector acts as a frequency mixer. Hence the response time of the diode must be as fast as the frequency of the incident radiation, in order that an alternating current may be induced with the same frequency as the incident radiation.

The output signal from coaxial connector 16 is fed into a 57 MHz intermediate frequency amplifier 29 with a 4 MHz bandwidth. The output from the amplifier 29 is rectified, averaged and displayed on an oscilliscope 27 which is triggered by chopper 31 when the lasers are operated continuously or by the voltage pulses from the photocell if the lasers are pulsed.

The klystron frequency is tuned until a "beat note" is observed on the oscilliscope 27. In our example, this occurs when the klystron frequency is nearly equal to the difference frequency between the fundamental of the unknown frequency and the third harmonic of the radiation from the water laser. Since the klystron frequency can be easily determined to a high degree of accuracy by standard frequency measuring techniques and the frequency of the $H_2O$ laser is known, the frequency of the unknown source may be easily computed.

In the above experiment, the frequency of the second source, the $H_2O$ laser, was assumed to be known. This frequency was determined by comparing it with a known lower frequency by the heterodyning process. For instance, the $H_2O$ laser at 28$\mu$ may be compared with a $D_2O$ water laser operating at nominally 84$\mu$. By continuing this comparing process with lower frequencies a chain may be built to extend to the microwave region, where frequencies can be measured with extreme accuracies by other types of detectors. Utilizing this technique, with the detector whose response time is as fast as the frequency to be measured, one can measure frequency in the visible and infrared domain to an accuracy of one part in $10^{11}$.

As a straight detector, the metal-to-metal point contact diode may be used in several different ways. If low power radiation impinges on the cat whisker, an alternating voltage with the frequency of the impinging radiation containing a DC component will appear in the output signal across the diode. If the impinging radiation is amplitude modulated, the modulation will appear in output signal across the diode. Power levels of $10^{-8}$ watts or less may be detected in this manner. Alternately, if the unknown lower power signal is mixed with a strong laser signal at a frequency in the vicinity of the frequency of the weak signal to be detected, an alternating voltage signgal with a DC component at the difference frequency of the laser and the weak signal will appear across the diode. Because of the diode's non linear characteristics, if the unknown signal is frequency modulated, the difference frequency will be correspondingly frequency modulated. Hence the detector acts as a frequency demodulator. If the difference in frequency of the weak unknown signal and the strong laser signal is large so that it is difficult to amplify, it is advantageous to apply a microwave signal to the diode with a frequency near to the difference frequency. In either case, the voltage that arises across the diode is a function of the amplitude of the weak unknown signal. If the superheterodyne technique is used, the diode can detect infrared or visible signals with power levels of $10^{-15}$ watts or less.

One important application utilizing the detector and this technique is the detection of spontaneous emissions lines, e.g. emissions from a gas discharge in the infrared, or far infrared. Another application would be its used as a radiometer for detection of weak spectral lines from the outer space.

The diode can also be used for generation of infrared and visible coherent monochromatic radiation. In this case, the cat whisker of the diode is subjected to incident radiation at a certain frequency. The antenna radiates at frequencies of integral multiples of incident radiation. Here again, a variable frequency microwave signal may be coupled into the diode, and a resulting radiation of frequency equal to the sum or difference of the integral multiples of the incident infrared and microwave signals will be emitted.

What is claimed is:

1. A method of producing an electrical output from visible radiation or infrared radiation of a wavelength less than about 10 microns comprising: providing an antenna terminating at a metal-to-metal diode junction; said antenna consisting of a conductor of effective cross dimension of the order of said radiation; said diode junction having: an effective diameter of the order of or less than 0.1 micron and a non-linear characteristic, with a resultant speed of response faster than the frequency of said radiation; directing said radiation upon said antenna to induce current therein of the frequency of said radiation; conducting said alternating current to said diode junction from said antenna and in response thereto developing an alternating voltage across said diode junction of the frequency of said radiation and alternating current through said junction having a non-linear relation to said voltage; and deriving from said diode junction an electrical output dependent upon but differing from said alternating voltage.

2. The method of claim 1 wherein said electrical output is obtained from induced alternating current of the frequency of said radiation rectified by said diode junction.

3. The method of claim 2 including detecting a D.C. voltage resulting from said rectification.

4. The method of claim 1 wherein said radiation directed upon said antenna is modulated and said electrical output is obtained from said modulation appearing across said diode junction.

5. The method of claim 1 including mixing in said junction said alternating voltage and an alternating voltage of a different frequency, and deriving from said junction an electrical output which is the result of such mixing, a function of both of said alternating voltages.

6. A method of responding to weak visible radiation or infrared radiation of a wave length less than 10 microns, employing the method of claim 5 including directing upon said antenna said weak radiation and relatively strong radiation of known frequency in the vicinity of the frequency of said weak radiation, mixing in said diode junction alternating currents induced by said radiations and deriving said electrical output from the result of such mixing.

7. The method of claim 6 wherein said electrical output is derived as a D.C. voltage resulting from rectification by said diode junction of a frequency resulting from said mixing.

8. The method of claim 6 wherein said weak signal is modulated and said electrical effect is obtained from modulation occurring across said diode junction in the difference frequency produced by said mixing.

9. The method of claim 8 including applying a signal to the diode junction with a frequency near to said difference frequency, and obtaining said effect from the result of such mixing.

10. The method of claim 1 wherein said antenna is of wire form, an end of which terminates at said diode junction, and said radiation is directed through a focusing means upon said antenna near said junction.

11. The method of claim 1 including focusing said radiation upon said antenna with the spot diameter of the focused radiation at its intersection with the antenna being of the order of several wave lengths of said radiation.

12. The method of claim 1 wherein said diode junction is formed between the end of a thin wire antenna and a metal conductor.

13. The method of claim 1 wherein said diode junction is provided between a tungsten antenna and a nickel conductor.

14. An optical rectification system for producing a rectified electrical output from visible radiation or infrared radiation of a wavelength less than about 10 microns comprising an antenna terminating at a metal-to-metal diode junction; said antenna consisting of a conductor of effective cross dimension of the order of said radiation; said diode junction having: an effective diameter of the order of or less than 0.1 micron and a non-linear characteristic, with a resultant speed of response faster than the frequency of said radiation; means defining an optical path for directing said radiation upon said antenna to induce current therein of the frequency of said radiation; said antenna conducting said alternating current to said diode junction from said antenna whereby through the interaction of said current and said diode juction there is produced an alternating voltage across said diode junction of the frequency of said radiation and an alternating current through said junction having a non-linear relation to said voltage; and an output connection for deriving from said diode junction an electrical output obtained from induced alternating current of frequency of said radiation rectified by said diode junction.

15. A frequency multiplier chain including a frequency of visible radiation or infrared radiation of a wavelength less than about 10 microns comprising an antenna terminating at a metal-to-metal diode junction; said antenna consisting of a conductor of effective cross dimension of the order of said radiation; said diode junction having: an effective diameter of the order of or less than 0.1 micron and a non-linear characteristic, with a resultant speed of response faster than the frequency of said radiation; means defining an optical path for directing said radiation upon said antenna to induce current therein of the frequency of said radiation; said antenna conducting said alternating current to said diode junction whereby through the interaction of said current and said diode junction there is produced an alternating voltage across said diode junction of the frequency of said radiation and an alternating current through said junction having a non-linear relation to said voltage, means for producing another alternating voltage across and related current through said diode junction and output means for deriving a signal derived from the result of mixing of frequencies related to said two currents in said diode junction.

16. A tunable detector for weak optical radiation useful for detection of spontaneous emission lines as from a gas discharge or for detection of spectral lines from outer space comprising: an antenna terminating at a metal-to-metal diode junction; and optical element for directing said weak optical radiation upon said antenna near said diode junction; a laser for producing a beam of radiation of known frequency and stronger power than said weak optical radiation, said radiation being in the range of visible and infrared of less than about 10 micron wave length, a second optical element for directing said laser beam upon said antenna near said diode junction; and a tunable source of lower frequency arranged to produce a signal across said diode junction; said antenna having an effective diameter of the order of or less than the wave lengths of radiation directed thereupon to induce therein currents of the same frequencies; said diode junction having a diameter of the order of or less than 0.1 micron and having a non-linear characteristic with a speed of response faster than the frequencies of said opical radiation and said laser beam; said optical elements arranged to couple said weak radiation and laser beam to said diode junction via said antenna whereby said diode junction is effective to mix alternating current signals based upon said radiating laser and lower frequency source; an output connection from said diode junction and an indicator responsive to said output to indicate the presence of beats between a mixture of signals based upon said optical radiation, laser beam and lower frequency source, said detector being tunable for optical radiation of differing frequency by varying the frequency of said lower frequency source.

* * * * *